United States Patent
Callaway

(10) Patent No.: US 7,874,096 B2
(45) Date of Patent: Jan. 25, 2011

(54) FISH RELEASING DEVICE

(76) Inventor: Patrick Michael Callaway, P.O. Box 70630, Fairbanks, AK (US) 99707

( * ) Notice: Subject to any disclaimer, the term of this patent is extended or adjusted under 35 U.S.C. 154(b) by 167 days.

(21) Appl. No.: 11/985,177

(22) Filed: Nov. 13, 2007

(65) Prior Publication Data

US 2008/0110077 A1 May 15, 2008

Related U.S. Application Data

(60) Provisional application No. 60/858,778, filed on Nov. 13, 2006.

(51) Int. Cl.
*A01K 91/00* (2006.01)
(52) U.S. Cl. .................. 43/43.12; 43/1; 43/4; 43/4.5
(58) Field of Classification Search ............. 43/43.1, 43/43.15, 17.2, 42.49, 4.5, 43.12, 1, 4; 24/512; 294/82.31, 82.32, 82.34; 177/131, 148, 149, 177/232, 235, 245
See application file for complete search history.

(56) References Cited

U.S. PATENT DOCUMENTS

| | | | | |
|---|---|---|---|---|
| 191,575 A * | 6/1877 | Eames | ........................ | 119/806 |
| 820,383 A * | 5/1906 | Ashland | .................. | 294/82.32 |
| 2,359,588 A * | 10/1944 | Shea | ........................ | 43/43.12 |
| 2,733,537 A * | 2/1956 | Elsberg | ...................... | 43/43.12 |
| 3,904,235 A * | 9/1975 | Fehr | ........................... | 294/106 |
| 3,925,920 A | 12/1975 | Walker | | |
| 3,952,382 A * | 4/1976 | Vaage | ....................... | 24/598.5 |
| 5,119,585 A | 6/1992 | Camp | | |
| 5,356,188 A * | 10/1994 | Maloberti et al. | .......... | 294/66.1 |
| 5,375,365 A | 12/1994 | Bronder | | |
| 6,421,949 B1 * | 7/2002 | Schytte | ....................... | 43/43.12 |
| 6,560,913 B1 | 5/2003 | Liao | | |
| 6,989,495 B2 | 1/2006 | Yang | | |
| 7,076,910 B1 * | 7/2006 | Xifra | ............................... | 43/4 |
| 7,478,497 B2 * | 1/2009 | Otsuka et al. | ..................... | 43/4 |

OTHER PUBLICATIONS www.sheltonproducts.com/SFD.html.

* cited by examiner

*Primary Examiner*—Joshua J Michener
(74) *Attorney, Agent, or Firm*—John Alumit; Patel & Alumit

(57) ABSTRACT

The present invention relates to a releasing device and more particularly a releasing device used to release fish in water. Deep-water fishes such as rockfish often exhibit the effects of rapid water pressure change such as expelled gas bladder, protruded eyes when brought to the surface. The fish releasing device of the present utilizes a jaw assembly, a weight, and other components to clamp onto a fish. The device is dropped into the water which pulls the fish beneath the surface of the water and automatically releases the fish upon the opening of the clamping jaw.

14 Claims, 6 Drawing Sheets

FISH RELEASING DEVICE

CROSS-REFERENCE TO RELATED APPLICATION

Figure 1:
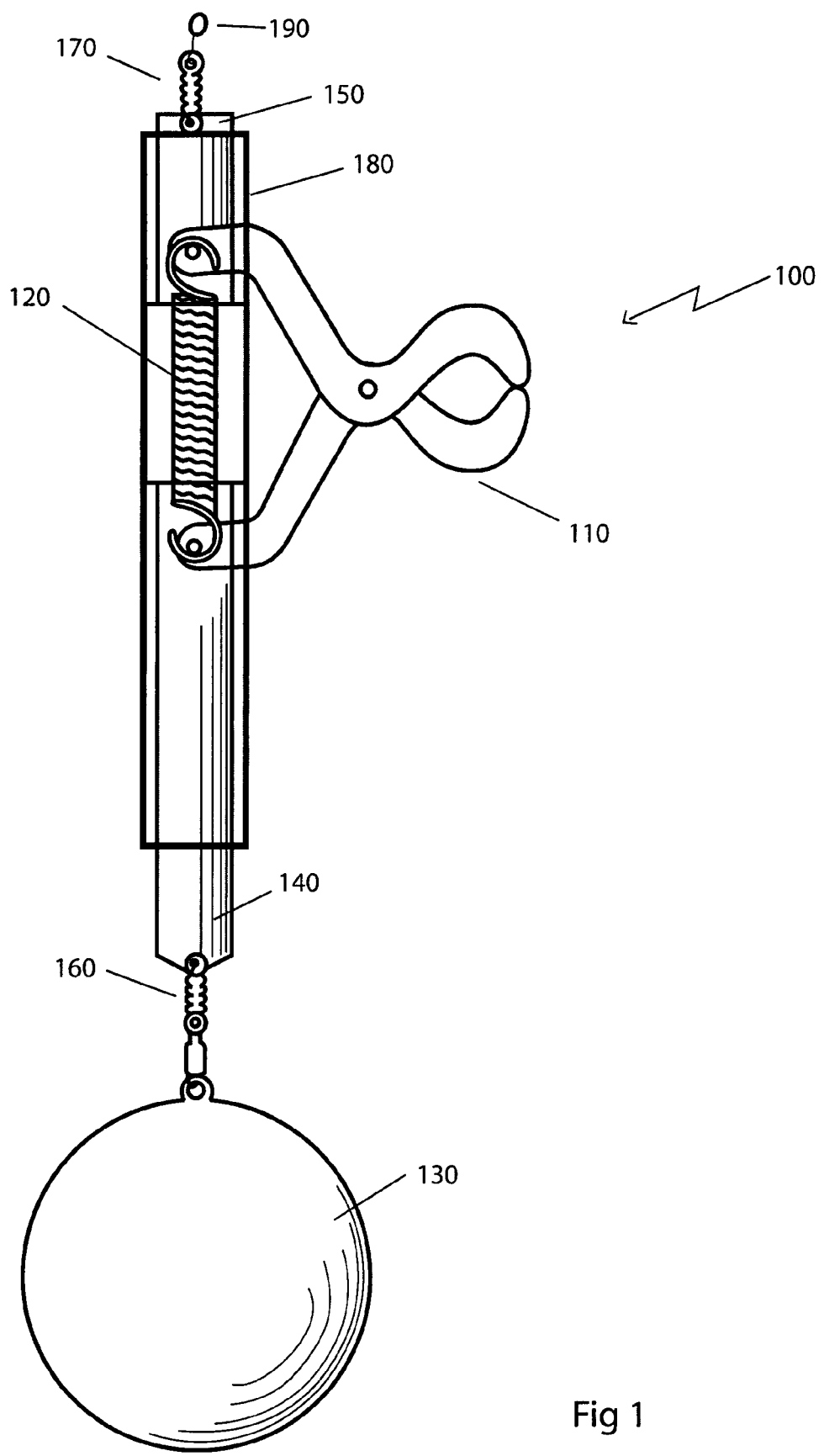

This application claims priority to provisional application 60/858,778 filed on Nov. 13, 2006.

FEDERALLY SPONSORED RESEARCH

Not Applicable

SEQUENCE LISTING OR PROGRAM

Not Applicable

BACKGROUND OF THE INVENTION

The present invention relates to a releasing device and more particularly a releasing device used to release fish in water. Deep-water fishes such as rockfish often exhibit the effects of rapid water pressure change such as expelled gas bladder, protruded eyes when brought to the surface. Most of these fish die because of barotrauma if simply thrown back in the sea. Additionally, most of these fish cannot submerge on their own since their air bladders expand, their eyes are pushed out of their socket, and their stomachs out of their mouth. When thrown back, the fish is like a buoy on the surface and they can't get back down.

The present invention returns the fish to deep water at speeds that safely reverse the effects of barotrauma by bringing the fish back to a depth to which the fish came. Due to the fish releasing device of the present invention, the fish's activity increases as the fish is lowered. When the gripping end of the jaw assembly is opens, the fish is free to swim away.

SUMMARY OF THE INVENTION

The present invention relates to a releasing device and more particularly a releasing device used to release fish in water. The fish releasing device of the present invention comprises a jaw assembly, a spring, and a weight.

The jaw assembly is made of two identical pieces of material cut in an S-like shape with an offset such that when the two identical pieces are assembled to form the jaw assembly, at least one end of a first S-like shape will meet an end of the second S-like shape for gripping. The gripping end of the jaw assembly may include a covering made of a soft material such as plastic or rubber to limit injuries to the fish being released.

A spring is located between the non-gripping ends of the jaw assembly, wherein the spring is connected to each non-gripping end. A weight is connected to one of the non-gripping end of the jaw assembly. On the other non-gripping end of the jaw assembly, or the end opposite the jaw assembly with the weight, an attachment mean is provided for attaching a line to the fish releasing device.

In a second embodiment, the structure of the fish releasing device of the present invention is similar to the structure described in the first embodiment except that the weight is connected to a lower interior pipe prior to being connected to one of the non-gripping end of the jaw assembly. The end of the lower interior pipe that is not connected to the weight may be connected to the non-gripping end of the jaw assembly.

The lower interior pipe may further comprise a slot and a first hole for receiving and connecting to the non-gripping end of the jaw assembly with the weight. In this configuration, a non-gripping end of the jaw assembly is inserted into the slot such that the hole in the non-gripping end of the jaw assembly is aligned with the first hole on the lower interior pipe prior to insertion of the means for attachment.

Alternatively, the means for attachment may be inserted into the hole on one side of the lower interior pipe, passed through the hole in the non-gripping end of the jaw assembly, through a loop at one end of the spring, and then through the hole on the other side of the non-gripping end of the jaw assembly.

Furthermore, the lower interior pipe may further comprise a second hole at the end opposite the first hole to connect the weight to the lower interior pipe.

In a third embodiment, the structure of the fish releasing device of the present invention is similar to the structure described in the first embodiment except attachment mean is connected to an upper interior pipe prior to being connected to one of the non-gripping end of the jaw assembly. The end of the upper interior pipe that is not connected to the attachment mean may be connected to the non-gripping end of the jaw assembly.

The upper interior pipe may further comprise a slot and a first hole for receiving and connecting to a non-gripping end of the jaw assembly. In this configuration, a non-gripping end of the jaw assembly is inserted into the slot such that the hole in the non-gripping end of the jaw assembly is aligned with the first hole on the upper interior pipe.

Alternatively, the means for attachment may be inserted into the hole on one side of the upper interior pipe, passed through the hole in the non-gripping end of the jaw assembly, through a loop at one end of the spring, and then through the hole on the other side of the upper interior pipe.

The upper interior pipe may further comprise a second hole at the end opposite the first hole to connect the attachment mean to the upper interior pipe.

In a fourth embodiment of the fish releasing device of the present invention, the new features in the second and third embodiments are combined with the features in the first embodiment to obtain the fourth embodiment of the present invention. The fourth embodiment comprises a weight connected to a lower interior pipe. The end of the lower interior pipe not connected to the weight is connected to one of the non-gripping end of the jaw assembly. On the non-gripping end of the jaw assembly opposite the one not connected to the weight, an upper interior pipe is connected to the non-gripping end. An attachment mean is connected the end of the upper interior pipe that is not connected to the non-gripping end of the jaw assembly.

In a fifth embodiment of the present invention, which is a modification of the second embodiment, the second embodiment further includes a lower swivel which connects the weight to the lower interior pipe. The end of the lower interior pipe which is not connected to the lower swivel and weight is connected to one of the non-gripping end of the jaw assembly.

In a sixth embodiment of the present invention, the third embodiment is modified to further include an upper swivel which connects the attachment mean to the upper interior pipe. The end of the upper interior pipe which is not connected to the upper swivel and attachment mean is connected to one of the non-gripping end of the jaw assembly.

In a seventh embodiment of the present invention, the embodiments disclosed in the fifth and sixth embodiments are combined to obtain the seventh embodiment. The seventh embodiment includes a lower swivel which connects the weight to the lower interior pipe. The end of the lower interior pipe which is not connected to the lower swivel and weight is connected to one of the non-gripping end of the jaw assembly. The seventh embodiment further includes an upper swivel which connects the attachment mean to the upper interior pipe. The end of the upper interior pipe which is not connected to the upper swivel and attachment mean is connected to the non-gripping end of the jaw assembly opposite the non-gripping end with the weight.

In an eighth embodiment of the present invention, a main body is provided to house the various components of the fish releasing device. The main body may house any of the embodiments discussed above. Depending on the embodiment to be housed, main body may house the lower interior pipe, lower swivel, upper interior pipe, upper swivel, spring, and/or non-gripping ends of the jaw assembly.

FIGURES

FIG. 1 The fish releasing device of the present invention.

Figure 2:
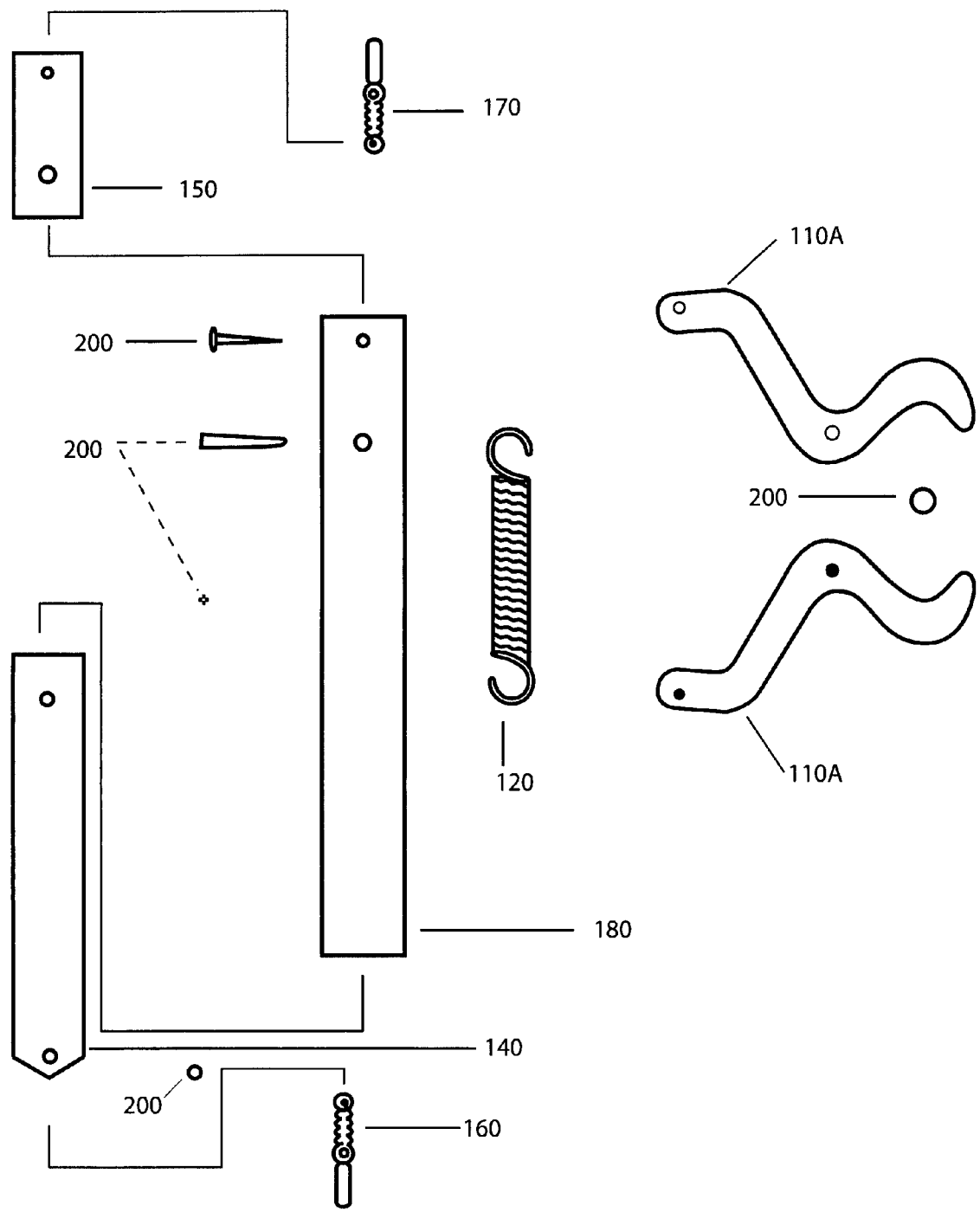

FIG. 2 Various components of the fish releasing device of the present invention.

Figure 3:
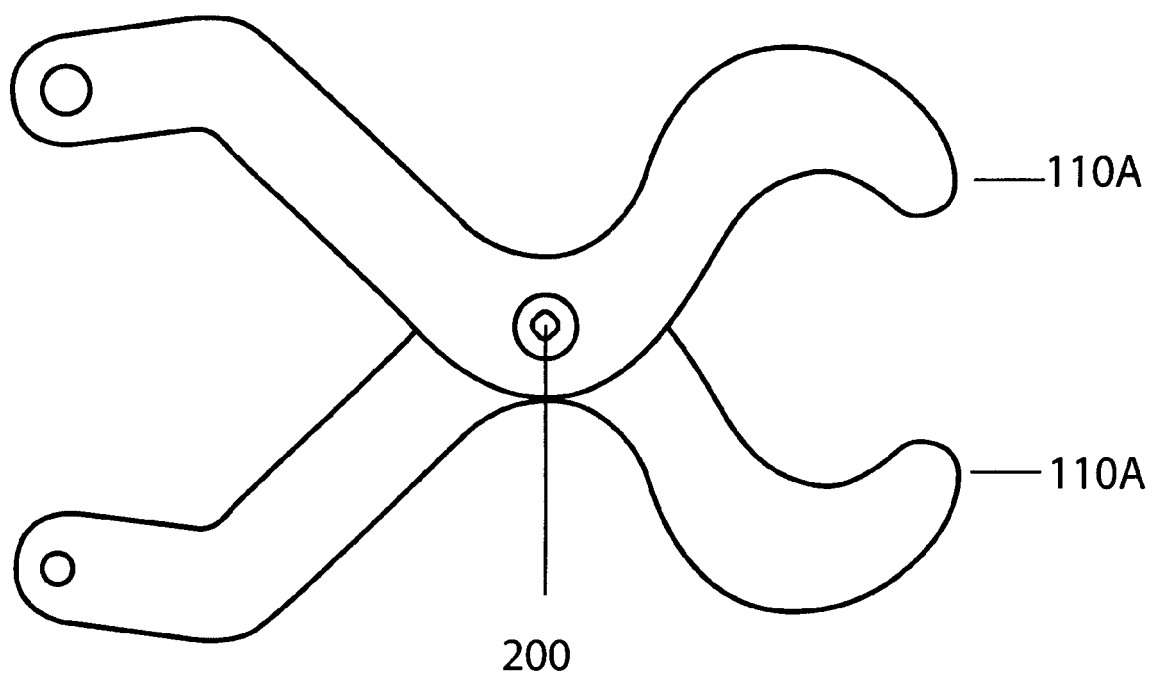

FIG. 3 Jaw assembly of the fish releasing device of the present invention.

Figure 4:
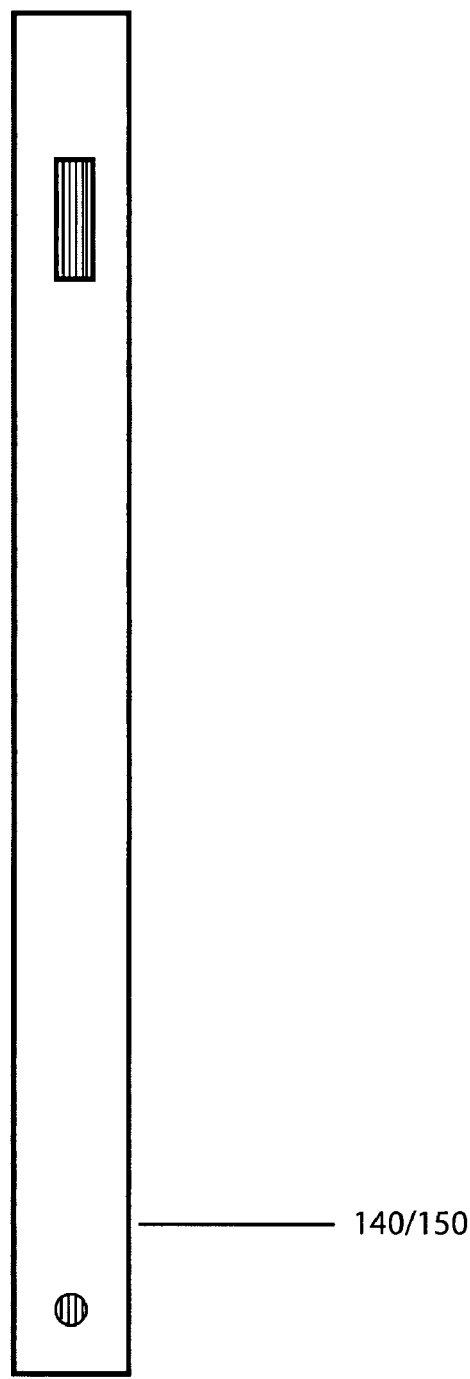

FIG. 4 Interior pipe component of the fish releasing device of the present invention.

Figure 5:
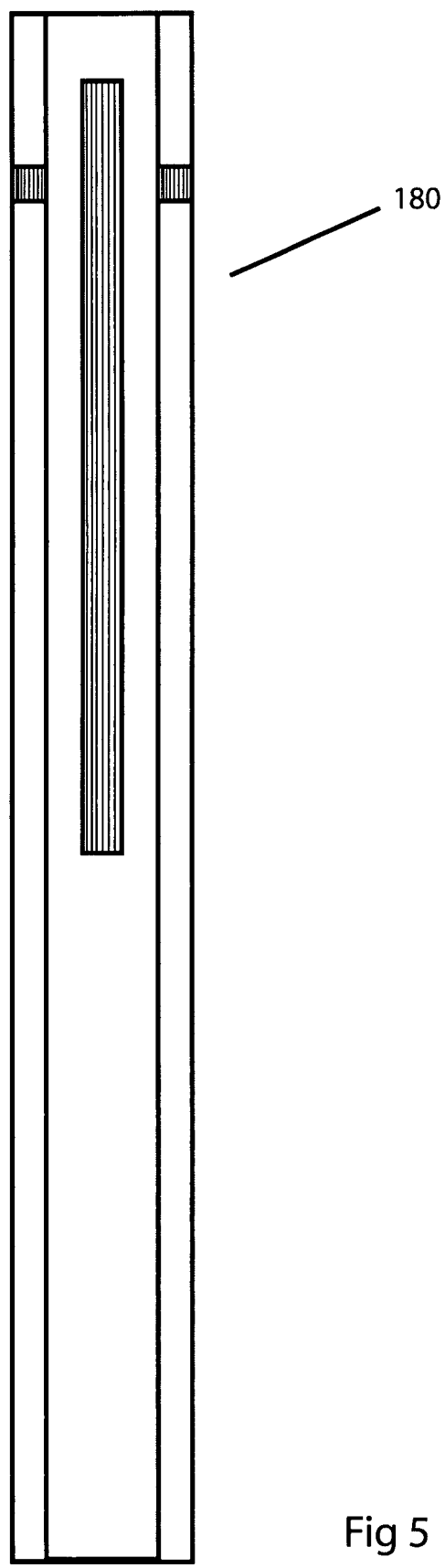

FIG. 5 Main body component of the fish releasing device of the present invention.

Figure 6:
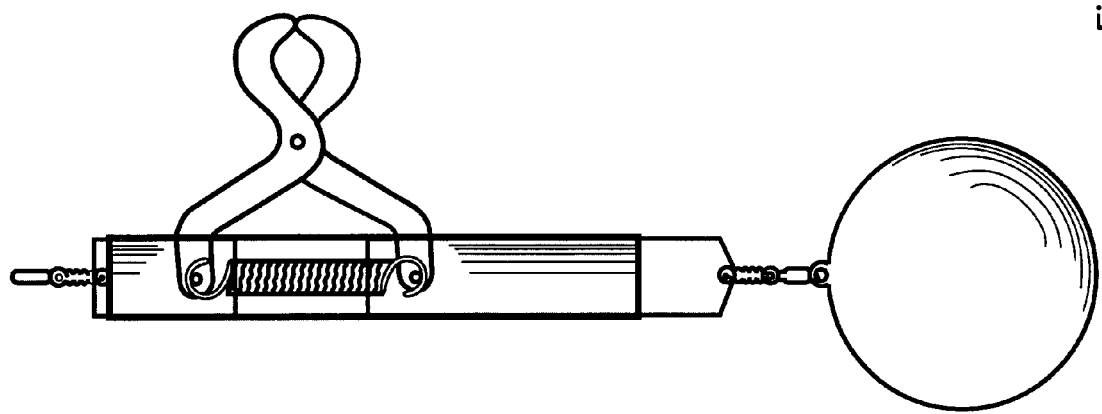
Figure 6:
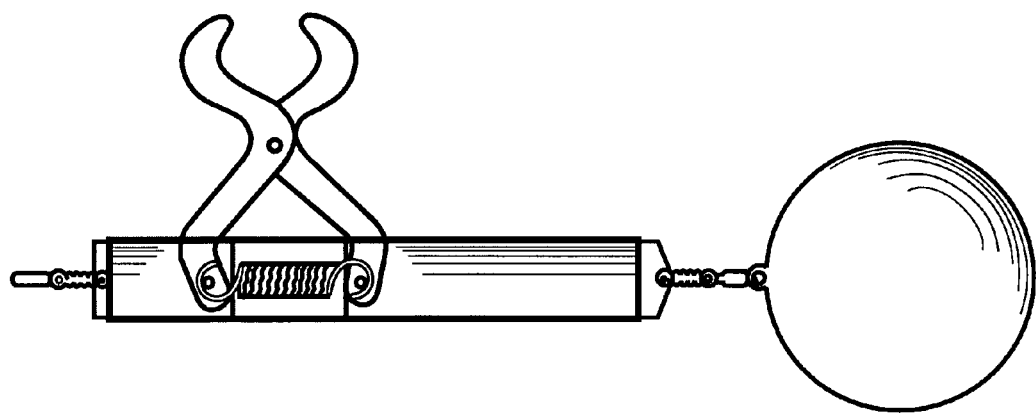

FIG. 6 The fish releasing device of the present invention in the closed and open position.

REFERENCE NUMERALS

100 ... Fish releasing device
110 ... Jaw assembly
110A ... S-like shape
120 ... Spring
130 ... Weight
140 ... Lower interior pipe
150 ... Upper interior pipe
160 ... Lower swivel
170 ... Upper swivel
180 ... Main body
200 ... Means for attachment

DESCRIPTION

The present invention relates to a releasing device and more particularly a releasing device used to release fish in water. Referring to FIGS. 1 through 5, the fish releasing device 100 of the present invention will be discussed in more detail. In a first embodiment of the fish releasing device 100 of the present invention, the fish releasing device 100 comprises a jaw assembly 110, a spring 120, and a weight 130.

The jaw assembly 110 is made of two identical pieces of material cut in an S-like shape 110A with an offset such that when the two identical pieces are assembled to form the jaw assembly 110, at least one end of a first S-like shape 110A will meet an end of the second S-like shape 110A for gripping. The ends that meet for gripping are referred to as the gripping end of the jaw assembly 110 and the ends not required to meet are referred to as the non-gripping end of the jaw assembly 110. The gripping end of the jaw assembly 110 may include a covering made of a soft material such as plastic or rubber to limit injuries to the fish being released.

The S-like shapes 110A are laid on top of each other such that a hole on the S-like shape 110A is aligned and the tips on at least one end of the S-like shapes 110A meet to form the gripping end on the jaw assembly 110. The hole is ideally located near the center of each S-like shape 110A. The other end of the S-like shapes 110A which does not touch each other forms the non-gripping end of the jaw assembly 110. To connect the S-like shapes 110A for creating the jaw assembly 110, any know means for attachment 200 may be used such as pins, screws, nuts and bolts, or rivets. The present invention uses a rivet that passes through the aligned hole when the S-like shapes 110A are laid on top of each other. A nut and bolt may also be used and passed through the hole before the bolt is secured with a nut. Other shapes for the jaw assembly 110 may be used as long as a gripping end is formed.

A spring 120 is located between the non-gripping ends of the jaw assembly 110 wherein the spring 120 is connected to each non-gripping end. The spring 120 may be connected to the non-gripping ends of the jaw assembly 110 by any means for attachment 200 known such as pins, screws, rivets, nuts and bolts, or welding. The spring 120 is connected such that each end of the spring 120 is connected to one non-gripping end of the jaw assembly 110.

A weight 130 is connected to one of the non-gripping end of the jaw assembly 110. The weight 130 may be connected to a hole on the non-gripping end of the jaw assembly 110 by tying the weight 130 to a string that is then passed through the hole and tied in place. Other means for attachment 200 of the weight 130 may be used such as pins, screws, rivets, nuts and bolts, or welding.

On the other non-gripping end of the jaw assembly 110, or the end opposite the jaw assembly 110 with the weight 130, an attachment mean 190 is provided for attaching a line to the fish releasing device 110. The attachment mean 190 may be a hole located on the non-gripping end of the jaw assembly 110. Alternatively, an attachment mean 190 such as a ring may be connected to a string which is then connected to the hole on the non-gripping end.

In a second embodiment, the structure of the fish releasing device 100 of the present invention is similar to the structure described in the first embodiment except that the weight 130 is connected to a lower interior pipe 140 prior to being connected to one of the non-gripping end of the jaw assembly 110. The lower interior pipe 140, while referred to as a pipe, may be hollow or solid. The lower interior pipe 140 may also be of any shape such as a cylinder, sphere, cube, pyramid, or triangle. In this embodiment, the weight 130 is connected to the lower interior pipe 140 by any means for attachment 200 such as a pin, screw, rivet, nut and bolt, or welding. The end of the lower interior pipe 140 that is not connected to the weight 130 may be connected to the non-gripping end of the jaw assembly 110 by tying the lower interior pipe AAA to a string that is then tied around the non-gripping end. Other known means for attachment 200 of the lower interior pipe 140 to the non-gripping end of the jaw assembly 110 may be used such as pins, screws, rivets, nuts and bolts, or welding. Alternatively, if a hole is providing on the non-gripping end of the jaw assembly 110, the means for attachment 200 of the lower interior pipe 140 to the non-gripping end of the jaw assembly 110 may be passed through the hole.

The lower interior pipe 140 may further comprise a slot and a first hole for receiving and connecting to the non-gripping end of the jaw assembly 110 with the weight 130. In this configuration, a non-gripping end of the jaw assembly 110 is inserted into the slot such that the hole in the non-gripping end of the jaw assembly 110 is aligned with the first hole on the lower interior pipe 140. To attach the lower interior pipe 140 and non-gripping end of the jaw assembly 110, any means for attachment 200 such as a pin, screw, rivets, nut and bolt, or welding or similar means for attaching is provided. The means for attachment 200 is inserted into the hole on one side of the lower interior pipe 140, passed through the hole in the non-gripping end of the jaw assembly 110, and then passed through the hole on the other side lower interior pipe 140. The means for attachment 200 may be secured into place to prevent it from slipping out of the holes.

Alternatively, the means for attachment 200 may be inserted into the hole on one side of the lower interior pipe 140, passed through the hole in the non-gripping end of the jaw assembly 110, through a loop at one end of the spring 120, and then through the hole on the other side of the non-gripping end of the jaw assembly 110. The means for attachment 200 may be secured into place to prevent it from slipping out of the holes.

The lower interior pipe 140 may further comprise a second hole at the end opposite the first hole, wherein the second hole is used for receiving a means for attachment 200 to connect the weight 130 to the lower interior pipe 140. The means for attachment 200 is inserted into the hole on one side of the lower interior pipe 140, passed through a hole in the weight 130, and then passed through the hole on the other side of the lower interior pipe 140. The means for attachment 200 may be secured into place to prevent it from slipping out of the holes.

In a third embodiment, the structure of the fish releasing device 100 of the present invention is similar to the structure described in the first embodiment except attachment mean 190 is connected to an upper interior pipe 150 prior to being connected to one of the non-gripping end of the jaw assembly 110. The upper interior pipe 150, while referred to as a pipe, may be hollow or solid. The upper interior pipe 150 may also be of any shape, such as a cylinder, sphere, cube, pyramid, or triangle. In this embodiment, the attachment mean 190 is connected to the upper interior pipe 150 by any means for attachment 200 such as a pin, screw, rivet, nut and bolt, or welding. The end of the upper interior pipe 150 that is not connected to the attachment mean 190 may be connected to the non-gripping end of the jaw assembly 110 by tying the upper interior pipe 150 to a string that is then tied around the non-gripping end. The upper interior pipe 150 may be attached by any means for attachment 200 to the non-gripping end of the jaw assembly 110 such as pins, screws, rivets, nuts and bolts, or welding. Alternatively, if a hole is provided on the non-gripping end of the jaw assembly 110, the means for attachment 200 of the upper interior pipe 150 to the non-gripping end of the jaw assembly 110 may be passed through the hole.

The upper interior pipe 150 may further comprise a slot and a first hole for receiving and connecting to a non-gripping end of the jaw assembly 110. In this configuration, a non-gripping end of the jaw assembly 110 is inserted into the slot such that the hole in the non-gripping end of the jaw assembly 110 is aligned with the first hole on the upper interior pipe 150. To attach the upper interior pipe 150 and non-gripping end of the jaw assembly 110, any means for attachment 200 such as a pin, screw, rivet, nut and bolt, welding or similar means for attaching is provided. The means for attachment 200 is inserted into the hole on one side of the upper interior pipe 150, passed through the hole in the non-gripping end of the jaw assembly 110, and then passed through the hole on the other side of the upper interior pipe 150. The means for attachment 200 may be secured into place to prevent it from slipping out of the holes.

Alternatively, the means for attachment 200 may be inserted into the hole on one side of the upper interior pipe 150, passed through the hole in the non-gripping end of the jaw assembly 110, through a loop at one end of the spring 120, and then through the hole on the other side of the upper interior pipe 150. The means for attachment 200 is secured into place to prevent it from slipping out of the holes.

The upper interior pipe 150 may further comprise a second hole at the end opposite the first hole, wherein the second hole is used for receiving a means for attachment 200, to connect the attachment mean 190 to the upper interior pipe 150. The means for attachment 200 is inserted into the hole on one side of the upper interior pipe 150, passed through a hole in the attachment mean 190, and then passed through the hole on the other side of the upper interior pipe 150. The means for attachment 200 may be secured into place to prevent it from slipping out of the holes.

In a fourth embodiment of the fish releasing device 100 of the present invention, the new features in the second and third embodiments are combined with the features in the first embodiment to obtain the fourth embodiment of the present invention. The fourth embodiment comprises a weight 130 connected to a lower interior pipe 140. The end of the lower interior pipe 140 not connected to the weight 130 is connected to one of the non-gripping end of the jaw assembly 110. On the non-gripping end of the jaw assembly 110 opposite the one not connected to the weight 130, an upper interior pipe 150 is connected to the non-gripping end. An attachment mean 190 is connected to the end of the upper interior pipe 150 that is not connected to the non-gripping end of the jaw assembly 110. The means for attachment 200 of the various components are similar to those discussed for the first, second, and third embodiments.

In a fifth embodiment of the present invention, which is a modification of the second embodiment, the second embodiment further includes a lower swivel 160 which connects the weight 130 to the lower interior pipe 140. The end of the lower interior pipe 140 which is not connected to the lower swivel 160 and weight 130 is connected to one of the non-gripping end of the jaw assembly 110. Any means for attachment 200 for connecting the various components may be used such as those discussed in the second embodiment.

If the lower interior pipe 140 comprises a second hole at the end opposite the first hole, the second hole may be used for receiving a means for attachment 200, to connect the lower swivel 160 to the lower interior pipe 140. The means for attachment 200 is inserted into the hole on one side of the lower interior pipe 140, passed through a hole in the lower swivel 160, and then passed through the hole on the other side of the lower interior pipe 140. The means for attachment 200 may be secured into place to prevent it from slipping out of the holes.

In a sixth embodiment of the present invention, the third embodiment is modified to further include an upper swivel 170 which connects the attachment mean 190 to the upper interior pipe 150. The end of the upper interior pipe 150 which is not connected to the upper swivel 170 and attachment mean 190 is connected to one of the non-gripping end of the jaw assembly 110. Any means for attachment 200 for connecting the various components may be used such as those discussed in the third embodiment.

If the upper interior pipe 150 comprises a second hole at the end opposite the first hole, the second hole may be used for receiving a means for attachment 200, to connect the upper swivel 170 to the upper interior pipe 150. The means for attachment 200 is inserted into the hole on one side of the upper interior pipe 150, passed through a hole in the upper swivel 170, and then passed through the hole on the other side of the non-gripping end of the jaw assembly 110. The means for attachment 200 may be secured into place to prevent it from slipping out of the holes.

In a seventh embodiment of the present invention, the embodiments disclosed in the fifth and sixth embodiments are combined to obtain the seventh embodiment. The seventh embodiment includes a lower swivel 160 which connects the weight 130 to the lower interior pipe 140. The end of the lower interior pipe 140 which is not connected to the lower swivel 160 and weight 130 is connected to one of the non-gripping end of the jaw assembly 110. The seventh embodiment further includes an upper swivel 170 which connects the attachment mean 190 to the upper interior pipe 150. The end of the upper interior pipe 150 which is not connected to the upper swivel 170 and attachment mean 190 is connected to the non-gripping end of the jaw assembly 110 opposite the non-gripping end with the weight 130. Any known means for attachment 200 for connecting the various components may be used such as those discussed in the second and third embodiment.

In an eighth embodiment of the present invention, a main body 180 is provided to house the various components of the fish releasing device 100. The main body 180 may house any of the embodiments discussed above. Depending on the embodiment to be housed, main body 180 may house the lower interior pipe 140, lower swivel 160, upper interior pipe 150, upper swivel 170, spring 120, and/or non-gripping ends of the jaw assembly 110. Main body 180 is hollow and may be cylindrical. However, it may be of any shape as long as it is of sufficient size to house the components of the fish releasing device 100. Main body 180 may further comprise at least one opening for receiving the non-gripping ends of the jaw assembly 110. There may also be holes in the main body 180 for allowing the passing through of means for attachment 200 to connect the various components.

To assemble the fish releasing device 100 with a main body 180, the lower interior pipe 140 is slid into the main body 180 until a hole in the lower interior pipe 140 lines up with the hole in the main body 180. The slot on the lower interior pipe 140 is also aligned with the opening in the main body 180 for receiving the non-gripping ends of the jaw assembly 110. A means for attachment 200 is inserted into the aligned hole and driven in approximately ⅓ of the way through. A spring 120 is inserted into the main body 180 until the lower loop on the spring 120 is over the means for attachment 200. The lower non-gripping end of the jaw assembly 110 is inserted until all the holes and lower loop on the spring 120 are aligned. The means for attachment 200 is then driven until it is flushed with the inside of the main body FFF. The lower interior pipe 140 is moved to make sure the lower interior pipe 140 freely slides inside the main body 180.

The upper interior pipe 150 is then inserted from the top end of the main body 180. The lower interior pipe 140 and jaw assembly 110 may be moved down if necessary prior to inserting the upper interior pipe 150. The hole and slot on the upper interior pipe 150 are aligned with the hole and opening on the main body 180, respectively. A means for attachment 200, such as a pin, is inserted through the hole in the main body 180 approximately ⅓ of the way. A hook tool is used to reach down the inside of the main body 180 to grab the top loop end of the spring 120 and place it over the means for attachment 200. The non-gripping end of the jaw assembly 110 is slid into the opening in the main body 180 and aligned with the means for attachment 200 and holes. The means for attachment 200 is driven until it is flush with the main body 180.

Ideally, the hole in the main body 180 should be larger than the means for attachment 200 and the hole on the other components of the fish releasing device 100. The hole on the other components of the fish releasing device 100 should be large enough to receive the means for attachment 200 without allowing it to pass completely through.

Referring to FIG. 6, operation of the fish releasing device is discussed. To use the fish releasing device 100, the fish to be returned is removed from the fishing hook or net. The fish releasing device 100 is attached to a line prior to lowering of the fish and fish releasing device 100 into the water. The weight 130 on the fish releasing device 100 is supported which causes the jaw assembly 110 to remain in the open position. The mouth of the fish is placed between the opened gripping ends of the jaw assembly 110. Support to the weight 130 is released. This clamps the gripping end of the jaw assembly 110 of the fish releasing device 100 to the fish to be released.

Once clamped onto the fish, the fish releasing device 100 and fish is lowered into the water until the gripping end of the jaw assembly 110 of the fish releasing device 100 opens to release the fish. The gripping end of the jaw assembly 110 automatically opens when the tension caused by the weight 130 on the jaw assembly 110 is diminished. This can occur when the weight 130 hits a surface in the ocean, such as the bottom of the ocean. When the weight hits a surface, the lower interior pipe 140 will travel up towards the top because of the spring 120. This will open the gripping end of the jaw assembly 110 since they are no longer held closed by the weight 130 but pulled open by the spring 120. The fish is therefore freed.

All the features disclosed in this specification, including any accompanying abstract and drawings, may be replaced by alternative features serving the same, equivalent or similar purpose, unless expressly stated otherwise. Thus, unless expressly stated otherwise, each feature disclosed is one example only of a generic series of equivalent or similar features.

While specific systems and methods have been disclosed in the preceding description, it should be understood that these specifics have been given for the purpose of disclosing the principles of the present invention and that many variations thereof will become apparent to those who are versed in the art.

What is claimed is:

1. A fish releasing device comprising:
   a jaw assembly comprising gripping ends and non-gripping ends;
   a spring located between the non-gripping ends of the jaw assembly wherein the spring is connected to each non-gripping end;
   a weight connected to one of the non-gripping ends of the jaw assembly;
   wherein the weight is connected to a lower interior pipe which is connected to a corresponding non-gripping end of the jaw assembly;
   an attaching means is located at the other non-gripping end of the jaw assembly opposite the end of the jaw assembly with the weight and the attachment means is connected to an upper interior pipe which is connected to the other corresponding non-gripping end of the jaw assembly opposite the weight;
   a main body to house the lower interior pipe, upper interior pipe, spring, and non-gripping ends of the jaw assembly, wherein the main body comprises a slot for receiving the non-gripping ends of the jaw assembly; and
   wherein the upper interior pipe comprises a slot and a first hole for receiving and connecting to the corresponding non-gripping end of the jaw assembly opposite the weight; and the lower interior pipe comprises a slot and a first hole for receiving and connecting to the other corresponding non-gripping end of the jaw assembly with the weight.

2. The fish releasing device of claim 1, wherein the jaw assembly is made of two identical pieces of material cut in an S-like shape with an offset such that when the two identical pieces are assembled to form the jaw assembly, at least one end of each S-like shape will meet for gripping.

3. The fish releasing device of claim 1, further comprising holes at the non-gripping ends of the jaw assembly for connecting to the weight and the attachment means.

4. The fish releasing device of claim 1, wherein the weight is connected to the lower interior pipe by a lower swivel and the lower interior pipe is connected to one non-gripping end of the jaw assembly.

5. The fish releasing device of claim 1, wherein the attachment means is connected to an upper swivel, which is connected to the upper interior pipe, which is connected to the non-gripping end of the jaw assembly opposite the weight.

6. The fish releasing device of claim 1, wherein the weight is connected to the lower interior pipe by a lower swivel and the attachment mean is connected to an upper swivel which is connected to the upper interior pipe.

7. The fish releasing device of claim 6, wherein the main body further houses the lower swivel and upper swivel.

8. The fish releasing device of claim 7, wherein: the upper interior pipe further comprises a second hole at the end opposite the first hole wherein the second hole is used for receiving an upper pin to connect the upper swivel to the upper interior pipe; and the lower interior pipe further comprises a second hole at the end opposite the first hole wherein the second hole is used for receiving a lower pin to connect the lower swivel to the lower interior pipe.

9. The fish releasing device of claim 8, wherein the first holes in the upper interior pipe and lower interior pipe are used for receiving connecting pins that connects the spring and non-gripping ends to the upper and lower interior pipe.

10. The fish releasing device of claim 9, wherein the jaw assembly comprises a S-like shape and the gripping end comprises a covering made of soft material.

11. The fish releasing device of claim 2, wherein the gripping end of the S-like shape further comprises a covering made of soft material.

12. The fish releasing device of claim 10, wherein the S-like shape are connected by a rivet.

13. A method for releasing a fish comprising the steps of:
utilizing the fish releasing device of claim 1 by clamping the gripping ends of jaw assembly to a fish and lowering the fish and fish releasing device into water until the gripping ends of the jaw assembly opens to release the fish.

14. The method of claim 13, wherein a line is attached to the fish releasing device prior to lowering of the fish and fish releasing device into the water; and retrieving the fish releasing device after the jaws open automatically releasing the fish when the weight comes to rest on a solid surface in the water.

* * * * *